United States Patent [19]

Smith

[11] 4,025,859
[45] May 24, 1977

[54] DRIVE SYSTEM FOR SWITCHED INDUCTIVE LOADS PARTICULARLY FOR MULTI-PHASE STEPPING MOTORS

[75] Inventor: Douglas A. Smith, Fife, Scotland

[73] Assignee: Burroughs Corporation, Detroit, Mich.

[22] Filed: Dec. 17, 1975

[21] Appl. No.: 641,401

[30] Foreign Application Priority Data

Jan. 23, 1975 United Kingdom ............... 2904/75

[52] U.S. Cl. ................................ 318/696; 318/138
[51] Int. Cl.² ......................................... H02K 37/00
[58] Field of Search .......... 318/696, 685, 138, 259; 307/41

[56] References Cited
UNITED STATES PATENTS 3,659,177   4/1972   Gelenius ............................ 318/696
3,885,210   5/1975   Burnett ............................. 318/696

Primary Examiner—Herman C. Hohauser
Attorney, Agent, or Firm—Benjamin J. Barish; Karl Stoess; Kevin R. Peterson

[57] ABSTRACT

A drive system for a plurality of inductive loads comprises a load energizing circuit for each inductive load, means connecting a DC voltage across all the circuits in parallel, and a switching device in each circuit selectively actuatable to energize the loads according to a predetermined sequence. The system also includes an energy storage circuit for each load energizing circuit having a capacitor charged by the collapse of the magnetic field in its respective inductive load when the latter's switching device is switched-off. Further included is an energy transfer circuit for each load energizing circuit to transfer the energy stored in the capacitor of one inductive load by the collapse of the magnetic field therein, when its switching device is switched-on, to the load energizing circuit of the inductive load next switched-on by its switching device.

4 Claims, 2 Drawing Figures

DRIVE SYSTEM FOR SWITCHED INDUCTIVE LOADS PARTICULARLY FOR MULTI-PHASE STEPPING MOTORS

BACKGROUND OF THE INVENTION

The present invention relates to drive systems for switched inductive loads, such as motor windings, relay coils, and the like. The invention is particularly useful for driving multi-phase stepping motors, and is therefore described below with respect to that application.

Multi-phase stepping motors are increasingly being used in applications requiring the accurate positioning of a member in response to a train of pulses. Various types of such stepping motors are known. Generally, they include a plurality of phase windings energizable by the train of pulses according to a predetermined switching sequence for rotating the output shaft in discreet angular steps.

One of the drawbacks of such stepping motors, however, is the limitation of speed. This limitation stems from the high inductance of the phase windings preventing the rapid current build-up in the windings as they are sequentially switched-on. That is to say, when a phase winding of the stepping motor is switched on, the current rises according to the exponential L/R, where L is the inductance and R is the resistance of the winding. The speed of operation may be increased by increasing the resistance R which lowers the time constant of the circuit, but this also increases the power requirement. A number of other methods have been employed for improving the speed performance of such drive circuits, but thses too have not been found satisfactory.

SUMMARY OF THE INVENTION

The present invention provides a new and improved drive system for plural inductive loads, particularly for improving the speed limitations in multi-phase stepping motors. According to the present invention, there is provided a drive system for a plurality "$n$" of at least three inductive loads, comprising: a load energizing circuit for each inductive load; means for connecting a DC voltage source across all the load energizing circuits in parallel; and a switching device in each load energizing circuit selectively actuable to energize the plurality of inductive loads according to a predetermined sequence. The system also includes an energy storage circuit for each load energizing circuit and comprising a capacitor and a first diode for each inductive load, the capacitor being connected in parallel across its respective switching device via its respective first diode, the latter being poled to charge the capacitor by the reverse voltage accompanying the collapse of the magnetic field in its respective inductive load when the latter's switching device is switched-off. The system further includes an energy transfer circuit for each load energizing circuit. The transfer circuit comprises a plurality of "$n-1$" second diodes, one for and connected between the capacitor of its respective energy storage circuit and each of the other load energizing circuits. The second diodes are poled to transfer the energy stored in the capacitor of one inductive load by the collapse of the magnetic field therein when its switching device is switched-on, to the load energizing circuit of the inductive load next switched-on by its switching device, to thereby enhance the build-up of current therein. Each of the load energizing circuits further includes a third diode poled to block the passage of the reverse voltage back to the DC voltage source.

Further features and advantages of the invention will be apparent from the description below.

BRIEF DESCRIPTION OF THE DRAWINGS

The invention is herein described, by way of example only, with reference to the accompanying drawings, wherein.

DETAILED DESCRIPTION OF THE PREFERRED EMBODIMENT

Figure 1:
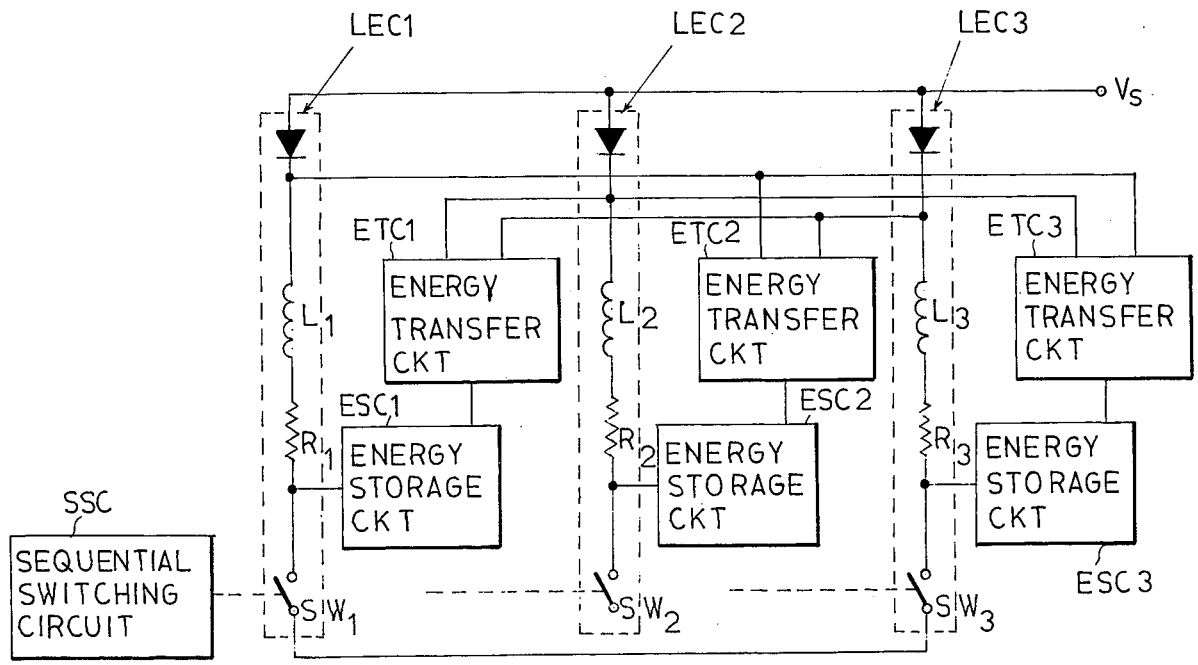
FIG. 1 is a block diagram illustrating a drive circuit for a three-phase stepping motor constructed in accordance with the invention.

With reference first to the generalized block diagram of FIG. 1, there is shown a system for driving or powering three inductive loads $L_1$, $L_2$ and $L_3$, which in the described preferred embodiment, are the multi-phase windings of a stepping motor. Each inductive load $L_1$, $L_2$, $L_3$ is in a load energizing circuit, generally designated by blocks LEC1, LEC2, LEC3, supplied from a DC voltage source Vs. As shown in FIG. 1, each load energizing circuit includes, in addition to the inductive load ($L_1$, $L_2$, $L_3$) represented by the inductance of the respective phase winding of the motor, a resistance $R_1$, $R_2$, $R_3$ representing the resistance of the respective winding, a diode $D_1$, $D_2$, $D_3$, and a switching device $SW_1$, $SW_2$, $SW_3$ controlled by a sequential switching circuit SSC to actuate the switching devices according to a predetermined sequence.

Each of the load energizing circuits LEC1, LEC2, LEC3 includes an energy storage circuit, generally designated by blcoks ESC1, ESC2, ESC3, which stores the energy in the inductive load $L_1$, $L_2$, $L_3$, namely the reverse voltage accompanying the collapse of the magnetic field, when its respective switching device is opened by the sequential switching circuit SSC. Each of the load energizing circuits further includes an energy transfer circuit, shown generally by blocks ETC1, ETC2, ETC3, which transfers the energy stored in the energy storage circuit of the switched-off inductive load to all the remaining load energizing circuits, so that such stored energy will be available to the next switched-on load energizing circuit to enhance the rapid build-up of current therein.

Thus, as shown in FIG. 1, energy transfer circuit ETC1, receiving the energy stored in the storage circuit ESC1 upon the switching-off of inductive load $L_1$, transfers this energy to both of the remaining two load energizing circuits LEC2 and LEC3, so that the next one switched-on will immediately have this energy available to it to ensure a rapid build-up of current therein. Similarly, the energy from the second inductive load $L_2$ is stored, when the inductive load is switched-off, in energy storage circuit ESC2 and is transferred by energy transfer circuit ETC2 to both of the remaining two load energizing circuits LEC1 and LEC3; and the energy from inductive load $L_3$ is stored, when that load is switched off, in its energy storage circuit ESC3 and is transferred by its energy transfer circuit ETC3 to both of the two remaining load energizing circuits LEC1 and LEC2.

Diodes $D_1$, $D_2$, $D_3$ are poled to block the passage of the reverse voltage, accompanying the collapse of the magnetic field in its respective load energizing circuit, back to the DC voltage source Vs.

It will thus be seen that as each inductive load $L_1$, $L_2$, $L_3$ is switched-off by the sequential switching circuit SSC, the reverse voltage accompanying the collapse of the magnetic field is stored in its respective energy storage circuit ESC1, ESC2, ESC3, and is immediately transferred to both of the two remaining inductive load circuits so as to enhance the rapid build-up of current in the inductive load next switched-on by its respective switching device.

When the system is used for driving a multi-phase stepping motor, which is the preferred embodiment, the system ensures a rapid build-up of current through the windings as each is switch-on, thereby substantially improving the speed limitaion of multi-phase stepping motors.

Figure 2:
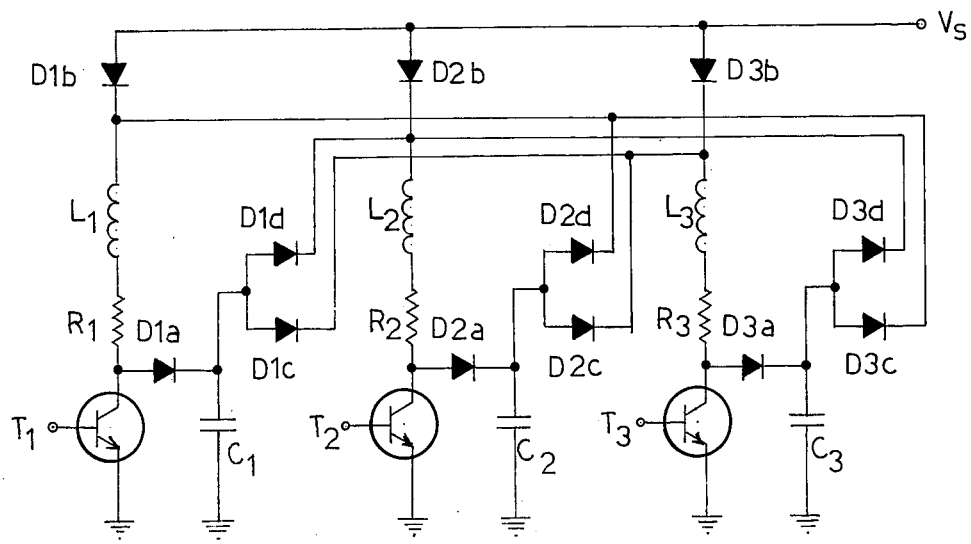
FIG. 2 is a circuit diagram illustrating a specific circuit used in the system of FIG. 1.

FIG. 2 illustrates more details of a system that could be used for driving a three-phase stepping motor in accordance with the invention. To facilitate understanding the circuit of FIG. 2, the three inductive loads (namely, the motor windings) are identified by the same reference characters L1, $L_2$, L3 representing their inductances, and $R_1$, $R_2$, $R_3$ representing their resistances.

Each of the winding circuits includes a switching device in the form of a transistor $T_1$, $T_2$, $T_3$ having grounded emitters. The bases of the transistors are connected to the sequential switching circuit SSC of FIG. 1 (not shown in FIG. 2) for energizing the motor windings according to a predetermined sequence. A capacitor $C_1$, $C_2$, $C_3$ is connected in parallel across each switching transistor via a diode D1a, D2a, D3a poled to charge its respective capacitor by the reverse voltage accompanying the collapse of the magnetic field in the respective winding when its switching transistor is turned-off. Each of the winding circuits further includes another diode D1b, D2b, D3b poled to block the passage of this reverse voltage back to the DC voltage source Vs.

The energy stored in the capacitor $C_1$, $C_2$, $C_3$ of the winding switched-off is immediately transferred, by means of a pair of further diodes for each capacitor, to the two other winding energizing circuits so that as soon as the next winding is turned-on by its respective switching transistor, the energy stored in the capacitor will be transferred to that winding to enhance the build-up of current therein. Thus, diodes D1c and D1d are connected to capacitor $C_1$ to transfer the energy stored therein upon switching-off its respective winding $L_1$ to the other two circuits for energizing windings $L_2$ and $L_3$, respectively; diodes D2c and D2d are connected to capacitor $C_2$ to transfer the energy from the switched-off winding $L_2$ to the other two windings $L_3$ and $L_1$; and diodes D3c and D3d are connected to capacitor $C_3$ to transfer the energy from the switched-off winding $L_3$ to the other two windings $L_1$ and $L_2$.

It will thus be seen that as each winding is switched-off, the energy stored in the magnetic field thereof is immediatedly transferred to all the other windings so that as soon as the next one is switched-on, the so-stored energy will be used to enhance the rapid build-up of current through the switched-on winding, thereby improving the performance of multi-phase stepping motors particularly with respect to the speed limitation mentioned earlier.

While the invention has been described with reference to a three-phase stepping motor, it will be appreciated that this is for purposes of example only, and that the invention could be advantageously used with stepping motors having a different number of phases, for example four or five, or with other switched inductive loads, such as relay coils.

Many other variations, modifications and applications of the illustrated embodiment will be apparent.

What is claimed is:

1. A drive system for a plurality "n" of at least three inductive loads, comprising:
    a load energizing circuit for each inductive load;
    means for connecting a DC voltage source across all said load energizing circuits in parallel;
    a switching device in each load energizing circuit selectively actuatable to energize the plurality of inductive loads according to a predetermined sequence.;
    an energy storage circuit for each load energizing circuit and comprising a capacitor and a first diode for each inductive load, the capacitor being connected in parallel across its respective switching device via its respective first diode, the latter being poled to charge the capacitor by the reverse voltage accompanying the collapse of the magnetic field in its respective inductive load when the latter's switching device is switched-off;
    and an energy transfer circuit for each load energizing circuit and comprising a plurality of "n-1" second diodes, one for and connected between the capacitor of its respective energy storage circuit and each of the other load energizing circuits, said second diodes being poled to transfer the energy stored in the capacitor of one inductive load by the collapse of the magnetic field therein when its switching device is switched-on, to the load energizing circuit of the inductive load next switched-on by its switching device, to thereby enhance the build-up of current therein; each of said load energizing circuits further including a third diode poled to block the passage of said reverse voltage back to the DC voltage source.

2. A drive system according to claim 1, wherein said switching devices are transistors.

3. Apparatus including a multi-phase stepping motor and a drive system therefor in accordance with claim 1, wherein the phase windings of the stepping motor constitute the plural inductive loads each energized by its respective load energizing circuit.

4. Apparatus according to claim 3, wherein the multi-phase stepping motor comprises three phase windings.

* * * * *